United States Patent Office 3,250,624
Patented May 10, 1966

3,250,624
FREE-FLOWING FUMARIC AND ADIPIC ACID COMPOSITIONS
John Hoole Van Ness, Kirkwood, Mo., assignor to Monsanto Company, St. Louis, Mo., a corporation of Delaware
No Drawing. Filed Nov. 25, 1964, Ser. No. 413,998
17 Claims. (Cl. 99—78)

The present application is a continuation-in-part of copending application, Serial No. 194,182, filed May 11, 1962, and now abandoned.

This invention relates to acid compositions and particularly to free-flowing fumaric acid and/or adipic acid compositions which are readily soluble in cold water.

Citric acid has been traditionally used as an acidulant for a variety of beverages both alcoholic and non-alcoholic. Thus citric acid has enjoyed widespread usage in the preparation of carbonated beverages, wines, dry beverage concentrates, beer and the like. Since adipic and fumaric acids are more effective than citric acid, and are completely edible and non-hygroscopic, these acids have previously been considered as potentially attractive beverage acidulants. However, they have one serious drawback. This shortcoming is their exceedingly low solubility in water. Less than one part of fumaric acid and only about one and a half parts of adipic acid can be dissolved in one hundred parts of water at approximately room temperature. By contrast, citric acid readily dissolves in less than its own weight of water at moderate temperatures.

Previous attempts to improve the solubility behavior of fumaric and adipic acids in cold water have centered about the incorporation of a particular class of surface-active agents, water-soluble salts and similar material with the acids. These prior efforts have met with some success, but the results heretofore achieved have left much to be desired. These known methods have some favorable effect on the cold water solubility of the acids but have not eliminated the problem. Then too, the presently known fumaric and adipic acid preparations have a relatively short shelf life and tend to cake when stored for a period of a month or more, even in water impervious packages. This renders them commercially unacceptable.

Therefore, it is an object of the present invention to provide fumaric acid and adipic acid in new and novel forms, overcoming the disadvantages of the prior art. More specifically, it is an object of this invention to provide free-flowing fumaric acid and adipic acid compositions that are readily soluble in cold water.

These and other objects are accomplished in accordance with the present invention, generally stated, by coating fumaric acid, adipic acid or mixtures of the two with a surfactant and mixing the coated acid with a flow-conditioning agent. The three essential components (namely, fumaric or adipic acid, a surfactant and a flow-conditioning agent) can be incorporated in the compositions of the present invention in a variety of ways. For example, the crystalline acids can be ground to a fine powder, coated with a surfactant and then mixed with a flow-conditioning agent. Alternately, the acids can be ground to a fine powder in the presence of a surfactant and subsequently mixed with a flow-conditioning agent. Likewise, the acids can be reduced to a fine powder in the presence of a surfactant and the flow-conditioning agent. When this latter method is used, however, the efficiency of most mills is greatly increased and there is a strong tendency for the acid to be reduced to an impalpable dust. Therefore, in view of the special requirements needed to prevent such severe particle size reduction of the acid, it is generally preferred to add the flow-conditioning agent to the milled, surfactant-coated acid composition. In this way, the desired particle size range is more readily obtained and the subsequent mixing operation does not entail undue processing.

Commercially available fumaric acid and adipic acid are random sized crystalline materials having particles within the range of 25 to 250 microns. In order to enhance their solubility characteristics, these materials must be reduced to a maximum average particle size of about 75 microns and preferably to a maximum average particle size within the range of 20 to 75 microns. However, particles significantly smaller than 20 microns are not desirable because they are readily air-borne, exceedingly difficult to handle, and exhibit increased agglomeration tendencies. The particle size reduction can be effected by conventional means. Thus the acids can be ground in most of the commercially available mills.

The proportions of surfactant used are preferably between about 0.1% and about 1% by weight of the acid. Generally, compositions containing less than about 0.1% surfactant do not exhibit the requisite solubility, whereas more than 1% surfactant serves no useful purpose. Also an excessive amount of surfactant tends to increase the tackiness and formation of acid agglomerates. Surfactants suitable for use in this capacity must be capable of wetting the surface of the acid particles and be readily miscible with water. They must be non-toxic and readily compatible with the acid. Preferably, the surfactant must have little or no tack so as to minimize clustering and exhibit, at most, a minimum of foaming properties when mixed with water. Ideally this material is in the form of a sprayable liquid which facilitates its addition to the acid. Surfactants particularly well suited for use in this capacity include dioctyl sodium sulfosuccinate, the benzyl ether of octylphenol and long chain fatty acid esters of a polyoxyethylene derivative of a hexitol anhydride derived from sorbitol.

The benzyl ether of octylphenol and the long chain fatty acid esters of a polyoxyethylene derivative of a hexitol anhydride derived from sorbitol are quite effective surfactants that can be readily sprayed onto the surface of the acid during, before or after its particle size reduction. Dioctyl sodium sulfosuccinate cannot be sprayed when used alone. However, this material can be easily dissolved in alcohol or acetone to provide a sprayable solution. Generally speaking, it has been found that much smaller amounts of dioctyl sodium sulfosuccinate and the benzyl ether of octylphenol are required, since these materials are more effective than the polyoxyethylene derivatives. While it is preferred to apply the surfactant to the acid by spraying, the coating operation can also be effected by other means, such as blending or tumbling the acid with the surfactant or a dispersion thereof, either at normal or elevated temperatures.

The flow-conditioning agent used in accordance with the present invention is a relatively dense, free-flowing, finely divided, solid material that is compatible with fumaric or adipic acid and with the surfactant. While the flow-conditioning agent can be soluble or insoluble in water, it must be non-hygroscopic. Also, this material must have an average particle size not substantially greater than the average particle size of the acid used in making up the present compositions. Thus, the average particle size of the flow-conditioning agent can generally vary between about 200 and about 500 U.S. Standard mesh. The flow-conditioning agent must be present in amounts equal to at least about 0.2% of the acid. When smaller amounts of the flow-conditioning agent are employed, the compositions exhibit definite tendencies of agglomeration and caking. Since any agglomerates are exceedingly difficult to dissolve in cold water, this minimum amount of the flow-conditioning agent must be used to provide an acceptable product. When a water-insoluble flow-conditioning agent is used, it has been found that proportions in excess of about 1% by weight of the acid have no useful effect but merely serve as a diluent. Likewise, when the acid composition is destined for use as an acidulant in crystal clear beverages, it is preferred to maintain the insoluble flow-conditioning agent content below about 0.5% by weight of the acid. Larger proportions impart a slight opalescence to such beverages which make them objectionable to the consumer. The proportion of the flow-conditioning agent can be materially increased when it is soluble in water. Thus, water-soluble flow-conditioning agents can be advantageously used in proportions up to about 5% by weight of the acid.

The amount of the flow-conditioning agent required in any particular composition generally varies with its surfactant content. Thus, compositions containing larger amounts of surfactant normally required proportionately larger amounts of a flow-conditioning agent. In general, it is preferred to employ compositions containing, based on the weight of the acid, between about 0.5% and about 0.8% of surfactant and between about 0.5% and about 1.0% flow-conditioning agent. Suitable flow-conditioning agents that can be used in accordance with the present invention include tricalcium phosphate, silica aerogel, calcium silicate, sodium aluminum silicate, sodium benzoate and the like.

Although this invention can be used wherever fumaric acid or adipic acid compositions are required to possess rapid solubility in cold water and storage stability, a preferred use is in cold water soluble dry powder beverage mixes, generally fruit flavored. A typical formula for a fruit flavored beverage mix utilizing this invention is, by weight per 100 parts, from 68 to 85 parts dextrose or other sweetening filler, from 0.5 to 3 parts color and flavoring, and from 14 to 29 parts fumaric or adipic acid composition. It is understood that the quantity of each ingredient in the composition will vary with the fruit flavor selected.

The invention and the manner in which it accomplishes its objects will be readily understood by reference to the following specific examples of preferred embodiments thereof. In these examples and throughout the specification, all proportions are expressed in parts by weight unless otherwise specified.

*Example 1*

About 100 parts of dry crystalline fumaric acid, having a particle size such that substantially all of the material passes through a 60-mesh screen and is retained on a 325-mesh screen, are treated by spraying with approximately 1.7 parts of a 30% solution of dioctyl sodium sulfosuccinate (Aerosol OT) in acetone. When the acetone solution is thoroughly blended with the fumaric acid, the acetone is evaporated from the resultant mixture by gently heating for approximately 30 minutes. The dried material is then removed from the blender and milled in an air classifying pulverizing mill. When the dry fumaric acid is ground sufficiently fine to pass through a 325-mesh screen, it becomes air-borne and is removed from the mill in a current of air. The mill exhausts into a centrifugal separator from which the finely divided fumaric acid provided with a coating of approximately 0.5% dioctyl sodium sulfosuccinate is collected. This material is then transferred to a ribbon blender together with approximately one part of dry tricalcium phosphate having an average particle size of approximately 325-mesh. These two materials are blended until a substantially uniform mixture is obtained and the tricalcium phosphate is distributed throughout the body of the fumaric acid. The product thus obtained is a dry, free-flowing, fumaric acid composition having a particle size between about 325 and 400 mesh. This free-flowing material contains about 0.5% dioctyl sodium sulfosuccinate and about 1.0% tricalcium phosphate based on the weight of the fumaric acid.

*Example 2*

The process of Example 1 is substantially repeated using the benzyl ether of octylphenol (Triton CF 10) instead of Aerosol OT. However, in this embodiment, the surfactant is rendered sufficiently fluid to be sprayed by heating it to about 50° C. This eliminates the use of a solvent and the need for its subsequent removal. The same amount of tricalcium phosphate is employed, and the product thus obtained is substantially equivalent to the product of Example 1.

*Example 3*

The process of Example 2 is repeated using a spray of polyoxyethylene sorbitan stearate (Tween 60) heated to a temperature of about 85° C. Here again, the product is free-flowing fumaric acid containing minor proportions of a surface-active agent and tricalcium phosphate.

*Examples 4 and 5*

Compositions containing silica aerogel and calcium silicate, respectively, instead of tricalcium phosphate as a flow-conditioning agent are prepared in substantially the same manner as set forth in Example 1 above. About 0.5 part silica aerogel and calcium silicate are used respectively, and have substantially the same average particle size as the tricalcium phosphate; that is, approximately 325 mesh. The resultant materials are also free-flowing and exhibit improved shelf life.

*Example 6*

The process of Example 1 is substantially repeated using 325-mesh sodium benzoate instead of tricalcium phosphate as the flow-conditioning agent. However, since this material is completely water soluble, it is advantageously employed in larger amounts. Thus, about 5 parts of sodium benzoate is blended with the coated fumaric acid collected from the centrifugal separator. This free-flowing preparation containing significant amounts of sodium benzoate is particularly well suited for use in the formulation of food preparations requiring a preservative. Thus, in this instance, sodium benzoate performs a dual function, acting both as a flow-conditioner and as a preservative.

In order to exhibit the superior characteristics of the compositions prepared in accordance with the present invention, samples of the preparations from each of the above examples were stored at about 50° C. for a period of approximately three weeks. This is an accelerated storage test conducted at a temperature well above those normally encountered. Samples of fumaric acid coated with approximately 0.5% Tween 60 without any flow-conditioning agent were also prepared and subjected to the same storage test as a control. At the end of the three-week period, the samples prepared in accordance with Examples 1 through 6 were free-flowing and exhibited no agglomeration or clustering. By contrast, the samples not containing any flow-conditioner were lightly caked and contained many clustered particles. More significant, however, was the difference in the solubility behavior of this material. Three- to four-gram portions of each of the samples subjected to the storage test were added to about two liters of cold water (approximately 5° C.) and stirred for about one minute. Those portions of fumaric acid obtained in accordance with the procedure of Examples 1 through 6 readily dissolved in water in a minute or less, leaving no solid residue. The control samples containing only fumaric acid and surfactant contained a number of agglomerates which were more difficult to dissolve. The greater portion of these control samples did go into solution within a relatively brief period, but in each instance a number of clusters settled to the bottom of the container and would not dissolve. In addition, the control samples were difficult to wet, as evidenced by acid particles floating on the surface of the water.

*Example 7*

About 22 grams of a beverage base containing, by weight, 2 parts color and flavoring and 76 parts dextrose, are mixed with 22 grams of the fumaric acid composition of Example 1. The acid-beverage base mixture is milled to reduce the average particle size to from about 20 to 50 microns. An additional 56 grams of the beverage base is thoroughly admixed with the milled powder to yield a dry beverage mix having, by weight, 76 parts dextrose, 2 parts color and flavoring, and 22 parts fumaric acid. A 14.2-gram sample of this dry beverage mix is placed in a paper envelope which is sealed and stored in a humidity chamber at 38° C. and 90% relative humidity. After 17 days, the envelope is removed from the humidity chamber, opened and inspected. The contents are substantially lump-free and granular. The sample, when added to two liters of water at 10° C., is substantially completely dissolved within one minute with mild agitation.

The term "readily soluble in cold water" is used herein to identify fumaric or adipic acid compositions that substantially completely dissolve in about 100 parts by weight of water at a temperature in the neighborhood of 20° C. within about a minute with only a minimum of agitation. The intensity of agitation required need only be sufficient to expose the acid particles to successive portions of water and to eliminate the formation of a quiescent envelope of a saturated acid solution about the discrete particles.

Numerous modifications will readily suggest themselves to those skilled in the art. Thus, while the invention has been described with particular reference to specific embodiments, it is to be understood that it is not to be limited thereto, but is to be construed broadly and restricted solely by the scope of the appended claims.

What is claimed is:

1. A free-flowing acid composition readily soluble in cold water comprising a powdered acid having an average maximum particle size of about 75 microns and selected from the group consisting of fumaric acid and adipic acid coated with between about 0.1% and about 1%, based on the weight of the acid, of a surfactant selected from the group consisting of dioctyl sodium sulfosuccinate, benzyl ether of octylphenol and long chain fatty acid esters of a polyoxyethylene derivative of a hexitol anhydride derived from sorbitol, and having up to about 5%, based on the weight of the acid, of a solid flow-conditioning agent having an average particle size not substantially greater than the average particle size of the acid, and selected from the group consisting of tricalcium phosphate, silica aerogel, calcium silicate, sodium aluminum silicate and sodium benzoate substantially uniformly dispersed therethrough.

2. A free-flowing acid composition readily soluble in cold water comprising a powdered acid having an average maximum particle size of about 75 microns and selected from the group consisting of fumaric acid and adipic acid coated with between about 0.1% and about 1% based on the weight of the acid, of a surfactant selected from the group consisting of dioctyl sodium sulfosuccinate, benzyl ether of octylphenol and long chain fatty acid esters of a polyoxyethylene derivative of a hexitol anhydride derived from sorbitol, and having between about 0.2% and about 1%, based on the weight of the acid, of a solid water-insoluble flow-conditioning agent having an average particle size not substantially greater than the average particle size of the acid, and selected from the group consisting of tricalcium phosphate, silica aerogel, calcium silicate and sodium aluminum silicate substantially uniformly mixed therewith.

3. A free-flowing acid composition readily soluble in cold water comprising a powdered acid having an average maximum particle size of about 75 microns and selected from the group consisting of fumaric acid and adipic acid coated with between about 0.2% and about 1%, based on the weight of the acid, of a surfactant selected from the group consisting of dioctyl sodium sulfosuccinate, benzyl ether of octylphenol and long chain fatty acid esters of a polyoxyethylene derivative of a hexitol anhydride derived from sorbitol, and having between about 0.2% and about 5%, based on the weight of the acid, of sodium benzoate substantially uniformly mixed therewith, the sodium benzoate having an average particle size not substantially greater than the average particle size of the acid.

4. A free-flowing acid composition readily soluble in cold water comprising a powdered acid having an average maximum particle size of about 75 microns and selected from the group consisting of fumaric acid and adipic acid coated with between about 0.1% and about 1% based on the weight of the acid, of a surfactant selected from the group consisting of dioctyl sodium sulfosuccinate, benzyl ether of octylphenol and long chain fatty acid esters of a polyoxyethylene derivative of a hexitol anhydride derived from sorbitol, and having about 0.2% to about 0.5%, based on the weight of the acid, of tricalcium phosphate substantially uniformly mixed therewith, the tricalcium phosphate having an average particle size not substantially greater than the average particle size of the acid.

5. A free-flowing acid composition readily soluble in cold water comprising a powdered acid having an average maximum particle size of about 75 microns and selected from the group consisting of fumaric acid and adipic acid coated with between about 0.1% and about 1%, based on the weight of the acid, of a surfactant selected from the group consisting of dioctyl sodium sulfosuccinate, benzyl ether of octylphenol and long chain fatty acid esters of a polyoxyethylene derivative of a hexitol anhydride derived from sorbitol, and having about 0.2% to about 0.5%, based on the weight of the acid, of silica gel substantially uniformly mixed therewith, the silica gel having an average particle size not substantially greater than the average particle size of the acid.

6. A free-flowing acid composition readily soluble in cold water comprising a powdered acid having an average maximum particle size of about 75 microns and selected from the group consisting of fumaric acid and adipic acid coated with between about 0.1% and about 1%, based on the weight of the acid, of a surfactant selected from the group consisting of dioctyl sodium sulfosuccinate, benzyl ether of octylphenol and long chain fatty acid esters of a polyoxyethylene derivative of a hexitol anhydride derived from sorbitol, and having about 0.2% to about 0.5%, based on the weight of the acid, of calcium silicate substantially uniformly mixed therewith, the calcium silicate having an average particle size not substantially greater than the average particle size of the acid.

7. A free-flowing acid composition readily soluble in cold water comprising a powdered acid having an average maximum particle size of about 75 microns and selected from the group consisting of fumaric acid and adipic acid coated with between about 0.1% and about 1%, based on the weight of the acid, of a surfactant selected from the group consisting of dioctyl sodium sulfosuccinate, benzyl ether of octylphenol and long chain fatty acid esters of a polyoxyethylene derivative of a hexitol anhydride derived from sorbitol, and having about 0.2% to about 0.5%, based on the weight of the acid, of sodium aluminum silicate substantially uniformly mixed therewith, the sodium aluminum silicate having an average particle size not substantially greater than the average particle size of the acid.

8. A method for the preparation of a free-flowing acid composition readily soluble in cold water which comprises mixing a powdered acid having an average maximum particle size of about 75 microns and selected from the group consisting of fumaric acid and adipic acid with between about 0.1% and about 1%, based on the weight of the acid, of a surfactant selected from the group consisting of dioctyl sodium sulfosuccinate, benzyl ether of octylphenol and long chain fatty acid esters of a polyoxyethylene derivative of a hexitol anhydride derived from sorbitol, and from about 0.2% to about 5%, based on the weight of the acid, of a solid flow-conditioning agent having an average particle size not substantially greater than the average particle size of the acid, and selected from the group consisting of tricalcium phosphate, silica aerogel, calcium silicate, sodium aluminum silicate and sodium benzoate.

9. A method for the preparation of a free-flowing acid composition readily soluble in cold water which comprises mixing a powdered acid selected from the group consisting of fumaric acid and adipic acid, between about 0.1% and about 1%, based on the weight of the acid, of a surfactant selected from the group consisting of dioctyl sodium sulfosuccinate, benzyl ether of octylphenol and long chain fatty acid esters of a polyoxyethylene derivative of a hexitol anhydride derived from sorbitol, and from about 0.2% to about 5%, based on the weight of the acid, of a flow-conditioning agent selected from the group consisting of tricalcium phosphate, silica aerogel, calcium silicate, sodium aluminum silicate and sodium benzoate, and grinding the resultant mixture to a fine powder having an average maximum particle size of about 75 microns.

10. A method for the preparation of a free-flowing acid composition readily soluble in cold water and having an average maximum particle size of about 75 microns which comprises grinding a powdered acid selected from the group consisting of adipic acid and fumaric acid to a fine powder, coating the powder with between about 0.1% and about 1%, based on the weight of the acid, of a surfactant selected from the group consisting of dioctyl sodium sulfosuccinate, benzyl ether of octylphenol and long chain fatty acid esters of a polyoxyethylene derivative of a hexitol anhydride derived from sorbitol, and mixing the coated powder with from about 0.2% to about 5%, based on the weight of the acid, of a flow-conditioning agent selected from the group consisting of tricalcium phosphate, silica aerogel, calcium silicate, sodium aluminum silicate and sodium benzoate.

11. A method for the preparation of a free-flowing acid composition readily soluble in cold water and having an average maximum particle size of about 75 microns which comprises grinding crystals of an acid selected from the group consisting of adipic acid and fumaric acid to a fine powder in the presence of between about 0.1% and about 1%, based on the weight of the acid, of a surfactant selected from the group consisting of dioctyl sodium sulfosuccinate, benzyl ether of octylphenol and long chain fatty acid esters of a polyoxyethylene derivative of a hexitol anhydride derived from sorbitol, and from about 0.2% to about 5%, based on the weight of the acid, of a flow-conditioning agent selected from the group consisting of tricalcium phosphate, silica aerogel, calcium silicate, sodium aluminum silicate and sodium benzoate.

12. A method in accordance with claim 10 in which the surfactant is a partial long chain fatty acid ester of a polyoxyethylene derivative of a hexitol anhydride derived from sorbitol and the flow-conditioning agent is tricalcium phosphate.

13. A method in accordance with claim 10 in which the surfactant is dioctyl sulfosuccinate and the flow-conditioning agent is tricalcium phosphate.

14. A method in accordance with claim 10 in which the surfactant is the benzyl ether of octylphenol and the flow-conditioning agent is tricalcium phosphate.

15. A composition readily soluble in cold water comprising fumaric acid having an average maximum particle size of about 75 microns coated with between about 0.1% and about 1%, based on the weight of the acid, of a surfactant selected from the group consisting of dioctyl sodium sulfosuccinate, benzyl ether of octylphenol and long chain fatty acid esters of a polyoxyethylene derivative of a hexitol anhydride derived from sorbitol, and having up to about 5%, based on the weight of the acid, of a solid flow-conditioning agent having an average particle size not substantially greater than the average particle size of the acid, and selected from the group consisting of tricalcium phosphate, silica aerogel, calcium silicate, sodium aluminum silicate and sodium benzoate substantially uniformly mixed therethrough.

16. A composition readily soluble in cold water comprising adipic acid having an average maximum particle size of about 75 microns coated with between about 0.1% and about 1%, based on the weight of the acid, of a surfactant selected from the group consisting of dioctyl sodium sulfosuccinate, benzyl ether of octylphenol and long chain fatty acid esters of polyoxyethylene derivative of a hexitol anhydride derived from sorbitol, and having up to about 5%, based on the weight of the acid, of a solid flow-conditioning agent having an average particle size not substantially greater than the average particle size of the acid, and selected from the group consisting of tricalcium phosphate, silica aerogel, calcium silicate, sodium aluminum silicate and sodium benzoate substantially uniformly mixed therethrough.

17. A cold water soluble beverage mix comprising, by weight, between about 0.5 and about 3 parts color and flavoring, between about 68 and about 86 parts crystalline sugar, and between about 14 and about 29 parts of an acid composition in accordance with claim 1.

References Cited by the Examiner

UNITED STATES PATENTS

| | | | |
|---|---|---|---|
| 2,332,735 | 10/1943 | Lyons | 99—78 |
| 3,009,810 | 11/1961 | Raffensperger et al. | 99—78 |
| 3,009,811 | 11/1961 | Raffensperger et al. | 99—78 |

A. LOUIS MONACELL, *Primary Examiner.*

R. AULL, *Assistant Examiner.*